United States Patent [19]

Thorsen et al.

[11] Patent Number: 4,706,467
[45] Date of Patent: Nov. 17, 1987

[54] CONTROL CIRCUIT FOR A REFRIGERATING DEVICE

[75] Inventors: Niels P. Thorsen, Sønderborg; Gilbert W. Jessen, Broager; Erik Thomsen; Jens R. Sørensen, both of Nordborg, all of Denmark

[73] Assignee: Danfoss A/S, Nordborg, Denmark

[21] Appl. No.: 937,399

[22] Filed: Dec. 3, 1986

[30] Foreign Application Priority Data

Dec. 21, 1985 [DE] Fed. Rep. of Germany ....... 3545602

[51] Int. Cl.$^4$ ............. F25C 1/00; F25D 17/02
[52] U.S. Cl. .......................... 62/139; 62/157; 62/201
[58] Field of Search .............. 62/139, 157, 158, 231, 62/233, 201, 138; 236/47

[56] References Cited

U.S. PATENT DOCUMENTS

| 2,027,223 | 1/1936 | Candor | 62/157 |
| 2,237,304 | 4/1941 | Greenlee | 62/157 |
| 3,496,733 | 2/1970 | Parker et al. | 62/139 |
| 4,497,179 | 2/1985 | Iwans | 62/139 X |
| 4,522,036 | 6/1985 | Van Gils | 62/157 |
| 4,526,012 | 7/1985 | Chigira | 62/201 X |

Primary Examiner—Harry Tanner
Attorney, Agent, or Firm—Wayne B. Easton

[57] ABSTRACT

The invention relates to a refrigeration unit of the type having a vessel for cooling water and a heat exchanger for the liquid to be cooled mounted in the vessel. Evaporator tubing is mounted on the inner wall of the vessel and a sensor mounted a predetermined distance from the tubing monitors the formation of an ice layer on the tubing. Control regulation which prevents both freezing and undesired heating of the cooling water is based on controlling the compressor providing first and second temperature ranges associated respectively with first and second sequentially generated time periods.

3 Claims, 3 Drawing Figures

CONTROL CIRCUIT FOR A REFRIGERATING DEVICE

The invention relates to a control circuit for a refrigerating device comprising a vessel with refrigerant for cooling goods, particularly beverages, an evaporator applied to the wall of the vessel, a compressor which can be switched on and off depending on predetermined desired switching on and off values, and a condenser, the control circuit having a sensor at a predetermined spacing from the evaporator and monitoring the formation of an ice layer on the evaporator.

In a known control circuit of this kind (U.S. Pat. No. 2,674,101), the temperature of a water refrigerant is kept slightly above 0° C. The goods to be cooled (milk in cans) are disposed in the water refrigerant. It is also possible to lead the average to be cooled through a heat exchanger which is immersed in the cooling water. To keep the cooling temperature of the refrigerating device as constant as possible near 0° C., one strives to maintain around the evaporator an ice layer of a few centimeters thickness without letting the cooling water freeze completely. The thickness of the ice layer depends on the position of the sensor measuring the electric conductivity of the water in the vicinity of the sensor.

The invention is based on the problem of providing a control circuit of the aforementioned kind by which a predetermined covering of ice is maintained at the evaporator of the refrigerating device even if the cooling load fluctuates considerably, especially if it is low.

According to the invention, this problem is solved in that the control circuit comprises a thermostat with a desired switching off value a few degrees below 0° C. and a desired switching on value periodically changeable between a desired temperature above 0° C. in a first time period and a desired temperature below 0° C. in a second time period.

This solution is based on the following consideration. When the water freezes, its conductivity decreases and the compressor is switched off, and vice versa. If the cooling load fluctuates drastically, it is difficult to maintain the correct temperature of the cooling water. If the refrigerating device in question is, say, a beer cooler in a restaurant, there will be times when the cooling load is practically non-existent or very low if no or little beer is being tapped, or times when the cooling load is extremely high if large quantities of beer are being tapped. In these cases there is a danger that the refrigerating water will freeze completely if the desired switching on temperature at which the compressor is switched on is set at a low value (e.g. at −1° C.) and the cooling load is very small so that the cooling temperature also drops below 0° C. On the other hand, with a higher setting for the desired switching on temperature (e.g. +1° C.) and a lower cooling load, the layer of ice may melt completely so that the cooling temperature rises above 0° C. If, at this setting, the cooling load is higher because, for example, more beer is being tapped and correspondingly more heat has been supplied, the refrigerating device could probably replace the molten ice because the compressor will then be in operation for a longer period. On the other hand, if the layer of ice has melted completely and the temperature of the water is correspondingly higher, the degree of refrigeration might no longer suffice if the cooling load rises suddenly because larger quantities of beer are being tapped. One therefore also strives to keep the temperature difference between the desired switching on temperature and the desired switching off temperature as small as possible to obtain the least possible fluctuations in the thickness of the ice layer. This cannot be achieved with the aid of a sensor that measures the electric conductivity of the water because this depends to a large extent on the purity of the refrigerating water that is employed.

If, however, in the solution according to the invention and for example in the case of a beer cooler when larger quantities of beer are being tapped, a higher cooling load occurs during that period in which the desired switching on value lies just above 0° C., the compressor will in any case run for a prolonged time so that the temperature at the evaporator is kept below 0° C. This to a large extent compensates for melting of the ice brought about by the supply of the beer to be cooled. On the other hand, with a low cooling load the layer of ice can melt down because the temperature will then remain above 0° C. for a longer time. During the following shorter operating period when the difference between the desired switching on and off values is low and the desired switching on temperature is slightly below 0° C., the thickness of the layer of ice will increase again.

Preferably, an electronic thermostat is employed of which the desired switching off value is fixed at −2° C. and the switching difference can be alternatively changed from about 1.5° to about 2.5° C., and vice versa. This alternately achieves a switching on temperature of about −0.5° C. and +0.5° C. at which, because of the relatively small switching difference achievable with such a thermostat, an adequately thick layer of ice is maintained.

The time periods of different switching difference of the thermostat may be determined by 0 and 1 output signals of a time generator.

Preferably, the time generator brings about a switching difference of about 2.5° C. during a first longer time period and a switching difference of about 1.5° C. during the second shorter time period. In this case the first time period may have a duration of about 4 hours and the second time period a duration of about 15 minutes.

A preferred development is characterized in that the first input of a first comparator is fed with the existing value signal of the temperature sensor to initiate switching off of the compressor, that a desired value switching on signal set at a voltage divider is fed to the first input of a second comparator initiating the switching on of the compressor, and that the first input of the first comparator and the second input of the second comparator are, for fixing the switching difference, interconnected by a resistor which is additionally connected to a voltage source by way of a constant current generator which can be set by the output signal of the time generator and of which the first short time period brings about a change in current and thus initiates a change in the switching difference.

The invention and its developments will now be described in more detail with reference to a preferred example illustrated in the drawing, wherein.

Figure 1:
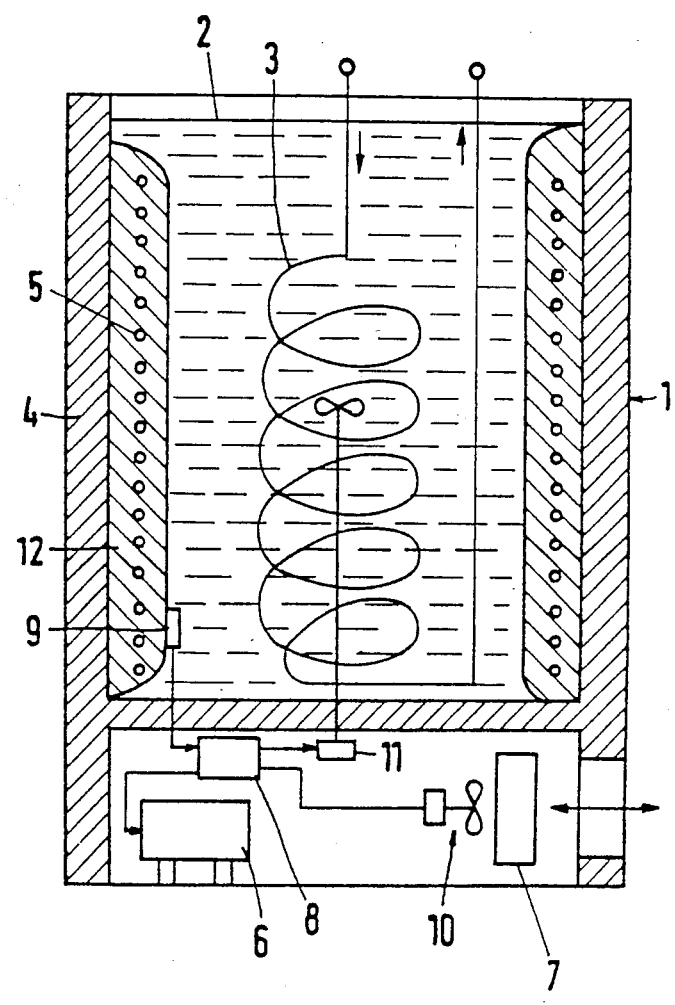
FIG. 1 is a diagrammatic cross-section through a refrigerating device with a control circuit according to the invention.

The refrigerating device shown in FIG. 1 is employed to cool beer. It comprises a vessel 1 of thermal insulating material filled with refrigerating water 2. The refrigerating water 2 contains a heat exchanger 3 through which the beer to be cooled is led. On the inside of the side wall 4 of the vessel 1 there is an evaporator 5 in the form of convoluted tubing disposed in a refrigerating circuit together with a compressor 6 and a condenser 7.

A control circuit 8 with a temperature sensor 9 in the form of a PCT resistor disposed at a predetermined spacing from the inside of the evaporator 5 in the cooling water 2 controls switching on and off of the compressor 6 depending on the temperature measured by the temperature sensor 9 and on the set desired switching on and off temperatures as well as the switching on and off of a fan 10 which blows cooling air through the condenser 7. Further, the control circuit 8 controls a stirring mechanism 11 which circulates the cooling water 2.

The control circuit in this way ensures, by appropriately switching the refrigerating device on and off, that the evaporator 5 will, independently of the refrigerating load (the quantity of beer flowing through the heat exchanger 3), always be surrounded by an ice layer 12 of predetermined thickness without freezing the entire cooling water 2, so that the cooling temperature of the water 2 will always be slightly above 0° C.

Figure 2:
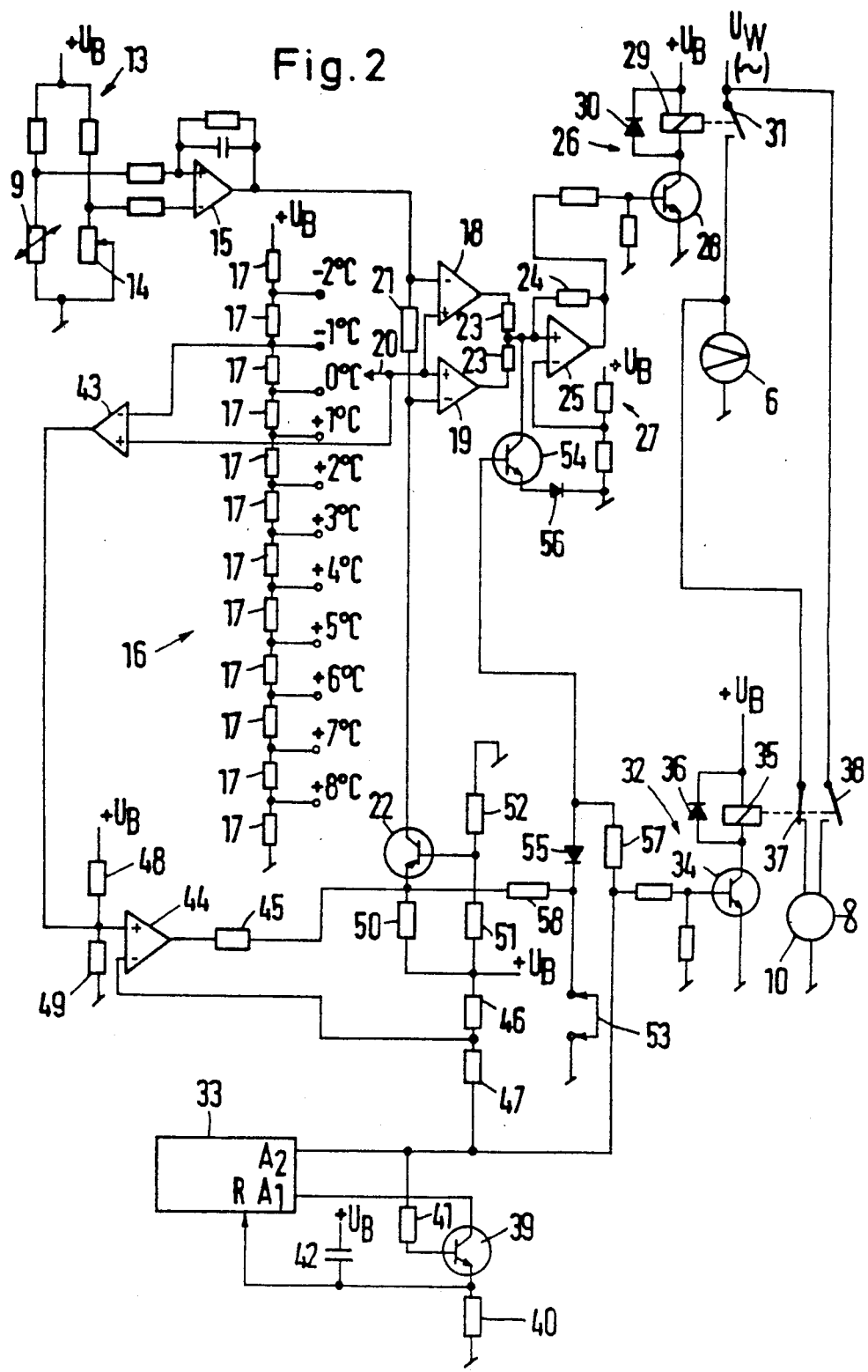
FIG. 2 is a circuit diagram of a control circuit according to the invention.

The control circuit 8 has the construction shown in FIG. 2. The PCT resistor acting as the temperature sensor 9 is disposed in a resistance measuring bridge 13 and is applied at a spacing from the evaporator 5 corresponding to the desired thickness of the ice layer 12. Resistance tolerances can be balanced out by means of an adjustable resistor 14 of the measuring bridge. The measuring voltage is amplified by a differential amplifier 15 of which the output signal is proportional to the change in resistance of the PCT resistor 9 and corresponds to the temperature at the point of measurement in the vessel 1.

The output signal of the differential amplifier 15 is compared with a desired switching on value set at a voltage divider 16 in the form of a plurality of series-connected resistors 17. The voltage divider 16 is applied to a D.C. operating voltage $U_B$ and has several tappings associated with different desired temperatures from $-2°$ C. to $+8°$ C. in steps of 1° C. The desired switching off value (hereinafter also termed "switching off temperature") is determined by a comparator 18 and the desired switching on value (hereinafter also termed "switching on temperature") by a comparator 19. Which of the tappings of the voltage divider 16 is employed depends on the particular use of the control circuit. For use with a beer cooler, the non-reversing input (+) of the comparator 19 is connected by way of a change-over switch 20 to a tapping associated with a desired switching off value of $-2°$ C. The hysteresis of the comparator device 18, 19 then determines the switching difference of the control circuit acting as a thermostat and is independent of the voltage drop at a resistor 21 connecting the reversing inputs (−) of the two comparators 18, and 19. This voltage drop is controlled by a transistor 22 acting as a constant current generator. The output signals of the comparators 18 and 19 are summated by way of two like input resistors 23 of a comparator 25 which is positively fed back by a further resistor 24 having a resistance equal to those of the resistors 23, so that a switching on/off signal for controlling the compressor 6 by way of a power stage 26 occurs at the output of the comparator 25, the comparator 25 comparing the summation signal fed to its non-reversing input (+) with the voltage that is tapped from a voltage divider 27 and fed to its reversing input (−).

The power stage 26 contains a power transistor 28 which is controlled through a base voltage divider by the output signal of the comparator 25 and in turn controls a relay 29 with a parallel recovery diode. The relay 29 has an operating contact 31 by way of which the motor of the compressor 6 can be applied to an A.C. operating voltage $U_w$.

A further power stage 32 is controlled by a time generator 33, the output signal of the time generator 33 being fed by way of a base voltage divider to a power transistor 34 of the power stage 32 which, in turn, controls a relay 35 with a parallel recovery diode 36. The relay 35 has a rest contact 37 and an operating contact 38, the A.C. operating voltage $U_w$ being fed by way of the operating contact 31 of the relay 29 and the rest contact 37 of the relay 35 to the input provided for one direction of rotation of the ventilator 10 or by way of the operating contact 38 to the input of the fan 10 provided for the other direction of rotation.

The time generator 33 contains a cycle pulse generator followed by a counter connected as a frequency divider. 0 and 1 signals with a duration of 15 minutes each occur at a first output $A_1$ of the time generator 33. An 0 signal with a duration of 4 hours alternates with a 1 signal with a duration of 15 minutes at the output $A_2$. If, after 15 minutes, a 1 signal occurs at the output $A_1$ and a 1 signal is still present at the output $A_2$, a transistor 39 which is disposed in series with an emitter resistor 40 between the output $A_1$ and earth and of which the base is operated by the output signal from the output $A_2$ by way of a base resistor 41 is brought into the conductive state so that a resetting input R of the time generator 33 is fed with a 1 signal from the emitter of the transistor 39 to reset the counter of the time generator so that an 0 signal with a duration of 4 hours again occurs at the output $A_2$.

A condenser 42 between the resetting input R and the positive pole of the source of operating voltage forcibly brings about resetting when switching on the operating voltage $U_B$, so that, after the time generator 33 is switched on, it will immediately deliver at the output $A_2$ an 0 signal for a duration of 4 hours. If the comparator 25 delivers a 1 signal (a positive output signal), the power transistor 28 is operated so that the relay 29 is attracted and the compressor 6 is switched on by the operating contact 31. This simultaneously applies the A.C. operating voltage $U_w$ to the fan 10 by way of the rest contact 37 of the relay 35, so that the ventilator 8 of the condenser 7 runs simultaneously with the compressor 6. The relay 35 is attracted by way of the power transistor 34 only when a 1 signal occurs at the output $A_2$ of the time generator 33. This means that the relay 35 is switched on every 4 hours for a duration of 15 minutes at a time. This causes the direction of rotation of the ventilator 8 to be reversed so that the condenser 7 is cleaned by a flow of air opposite to the direction of the air flow during operation of the condenser 7.

Two further comparators 43 and 44 are responsible for controlling the thickness of the ice layer. The reversing input (−) of the comparator 43 is connected to the tapping of the voltage divider 16 associated with the temperature of −1° C. The non-reversing input (+) is, together with the desired value input (+) of the comparator 19 responsible for the switching on temperature, connected to another tapping of the voltage divider 16. The output of the comparator 43 is connected to the non-reversing input (+) of the comparator 44 of which the output is connected by way of a resistor 45 to the emitter of the transistor 22. The reversing input (−) of the comparator 44 is connected to the tapping of a voltage divider consisting of resistors 46 and 47. This voltage divider is connected on the one hand to the operating voltage (+) $U_B$ and on the other hand to the output $A_2$ to the time generator 33. By means of this voltage divider 46, 47 one ensures that the input voltage at the reversing input of the comparator 44 is smaller than the output pulses of the time generator 33 that is likewise driven by the operating voltage $U_B$. The non-reversing input of the comparator 44 is applied to the tapping of a voltage divider consisting of resistors 48 and 49 and likewise applied to the operating voltage $U_B$.

The emitter of the transistor 22 is connected to the operating voltage $+U_B$ by way of a resistor 50 whilst the base of the transistor 22 is applied to the tapping of a voltage divider consisting of resistors 51 and 52, the voltage divider 51, 52 being likewise applied to the operating voltage $U_B$.

In all positions of the voltage divider change-over switch 20, except the position in which it is applied to the tapping associated with the temperature of −2° C., the output voltage of the comparator 43 is zero and the resistor 49 is short circuited so that the voltage is likewise zero at the non-reversing input (+) of the comparator 44. Since the voltage at the reversing input (−) of the comparator 44 is always 2 V or more than 4 V (because of the output pulses of the time generator), an 0 signal always occurs at the output of the comparator 44, so that a current of $+U_B$ flows to the output of the comparator 44 by way of the resistors 50 and 45 and the voltage at the emitter of the transistor 22 drops accordingly. The result is a low current through the transistor 22 and the resistor 21 with a correspondingly low voltage drop at the resistor 21. This corresponds to a small switching difference (hysteresis) of about 1.5° C.

If, on the other hand, the change-over switch 20 is set to −2° C. to ensure the maintenance of an ice layer at the evaporator 5, the output of the comparator 43 is interrupted, which means a high resistance, so that the voltage at the non-reversing input (+) of the comparator 44 is determined only by the voltage divider 48, 49 at the tapping of which about 3 V occur with an operating voltage $U_B=5$ V. Consequently, the comparator 44 delivers a 1 signal (with a high voltage), with no current flowing through the resistor 45, so that the switching difference is a maximum of 2.5° C. This only occurs when there is no pulse, i.e. no 1 signal, at the output $A_2$ of the time generator 33, that is to say, during a duration of 4 hours. After every expiry of 4 hours, however, a 1 signal occurs with a duration of 15 minutes to increase the voltage at the reversing input of the comparator 44 to above 3 V, so that the output voltage of the comparator 44 drops and the thermostatic switch again has less hysteresis until the 1 output pulse of the time generator 33 disappears again after 15 minutes.

Figure 3:
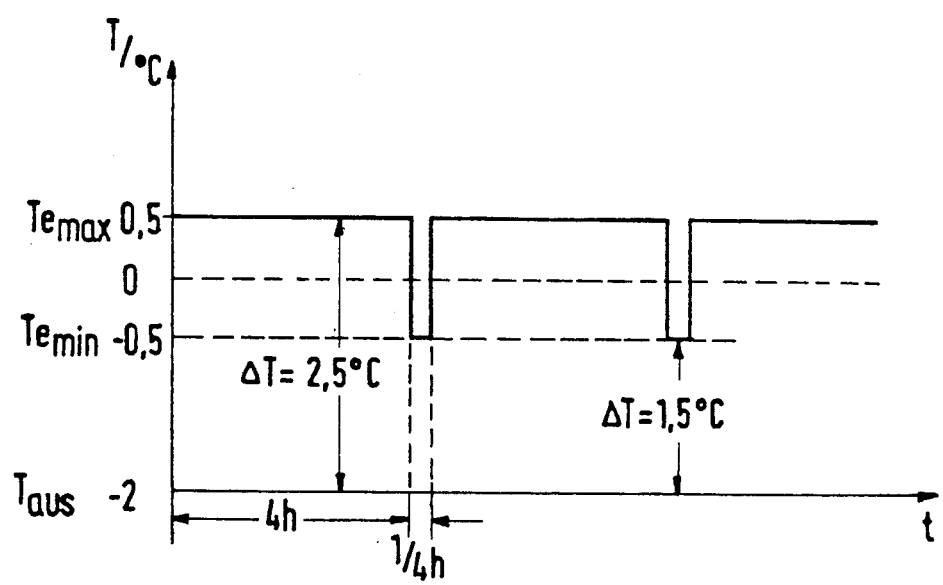
FIG. 3 is a diagram showing the relationship in time of the desired switching on and off temperatures with a particular setting of the control circuit according to the invention.

Consequently, the thermostat has a switching on temperature $Te_{max}$ of 0.5° C. for 4 hours and, during a period of 15 minutes, a switching temperature $Te_{min}$ of −0.5° C. with a switching off temperature $T_{aus}$ of −2° C. as is shown in FIG. 3.

The setting of the change-over switch 20 to a switching off temperature of −2° C. is chosen for an application where beer is to be cooled while maintaining a predetermined thickness of ice layer at the evaporator. In this case, there must be a short circuiting bridge 53 which connects to earth by way of a diode 55 the base of a transistor 54 which has its collector-emitter path connected between the non-reversing input (+) of the comparator 25 and earth, so that the transistor 54 between the emitter of which and earth there is a further diode 56 is blocked. This transistor 54 merely serves to block the compressor 6 in certain cases by the output signal from the output $A_2$ of the time generator 33 which is likewise connected to the base of the transistor 54 by way of a resistor 57. When the short circuiting bridge 53 is applied, the switching difference of the thermostat is small (1.5° C.). When the short circuiting bridge is not applied, the switching difference amounts to 2.5° C. When used as a thermostat for a beer cooler and with the short circuiting bridge 53 applied, the switching difference can be increased if the comparator 44 applies a positive voltage by way of the resistor 45 to the emitter of the transistor 22.

If the cooler according to FIG. 1 is to be employed simply as a liquid cooler, that is to say without ice, with which the desired switching on value would hardly be set at below 0° C., the desired switching off values may be freely set between 0° C. and 8° C. by appropriately connecting the non-reversing input (+) of the comparator 19 to the appropriate tapping of the voltage divider 16. For all settings of the desired switching on value other than −2° C., the output of the comparator 43 is at 0 V, so that the output signal of the comparator 44 is likewise low or zero, a current flowing by way of the resistor 45 to earth so that only a very small current flows through the resistor 21 that determines the switching difference and the switching difference is very low (1.5° C.).

If cooling is to take place only with air instead of liquid, the short circuiting bridge 53 may be omitted so that the switching difference becomes a maximum of 2.5° C. Accordingly, the switchoff temperature of the air can then also be set to the range of −2° C. to +8° C. with a switching difference of +3° C.

A resistor 58 between the emitter of the transistor 22 and the cathode of the diode 55 prevents short circuiting of the emitter of the transistor 22 when the short circuiting bridge 53 is incorporated.

We claim:

1. A refrigeration unit, comprising, a vessel for receiving cooling water, a heat exchanger mounted in said vessel, a compressor having switching means, evaporator tubing connected to said compressor and mounted on the inner wall of said vessel, a sensor mounted on predetermined distance from said evaporator tubing for monitoring the formation of an ice layer on said tubing, thermostatic control circuit means connected to and responsive to said sensor for switching said compressor on and off between temperature differentials characterized by first and second temperature ranges associated respectively with first and second sequentially generated time periods, said first temperature range being approximately between $+1\frac{1}{2}°$ C. and −2° C. and said second temperature range being approximately between $-\frac{1}{2}°$ C. and −2° C.

2. A refrigeration unit according to claim 1 including time generator means for effecting said temperature differentials and for making said first time period approximately four hours in length and said second time period approximately ¼ hour in length.

3. A refrigeration unit according to claim 2 having first and second comparators connected to said compressor switching means, said first comparator being connected to said sensor to effect switching off of said compressor and said second comparator being connected to said sensor to effect switching on of said compressor, resistor means between the inputs of said comparators for fixing said temperature differentials, a voltage source, a constant current generator between said voltage source and said resistor means, and means connecting said time generator means to said constant current generator to effect changes in said temperature differentials.

* * * * *